United States Patent [19]

Janda et al.

[11] Patent Number: 4,514,838

[45] Date of Patent: Apr. 30, 1985

[54] ARRANGEMENT FOR ADJUSTMENT OF THE VERTICAL TRACKING FORCE ON A PHONOGRAPH STYLUS

[75] Inventors: Jiri Janda; Karel Hrdlicka, both of Prague, Czechoslovakia

[73] Assignee: Tesla, koncernovy podnik, Prague, Czechoslovakia

[21] Appl. No.: 437,621

[22] Filed: Oct. 29, 1982

[30] Foreign Application Priority Data

Apr. 21, 1982 [CS] Czechoslovakia .................... 2384-82

[51] Int. Cl.³ .............................................. G11B 21/16
[52] U.S. Cl. .................................................... 369/254
[58] Field of Search ............... 369/244, 247, 248, 251, 369/253, 254, 256

[56] References Cited

U.S. PATENT DOCUMENTS 3,093,379  6/1963  Fabel et al. ...................... 369/254

FOREIGN PATENT DOCUMENTS 1036034  7/1966  United Kingdom ................ 369/254

Primary Examiner—Steven L. Stephan

[57] ABSTRACT

Arrangement for the adjustment of the vertical tracking force on a phonograph stylus. The arrangement has a rotatable adjusting element with a pinion meshing with a rack gear on the rear part of a flat tone arm, said adjusting element being connected with a counterweight disposed beneath the rear end portion of the tone arm. The rear portion of the tone arm is provided with a reinforcing member which also serves to prevent the counterweight from rotating with the adjusting element.

3 Claims, 2 Drawing Figures

ARRANGEMENT FOR ADJUSTMENT OF THE VERTICAL TRACKING FORCE ON A PHONOGRAPH STYLUS

BACKGROUND OF THE INVENTION

The invention relates to an arrangement for the adjustment of the vertical tracking force on a phonograph stylus, such arrangement forming a part of the tone arm upon which the stylus holder is mounted.

Tone arms which are at present phonographs of the hi-fi class are practically only tubular in shape, and are provided with arrangements for the adjustment of the vertical tracking force on the stylus. This arrangement is usually fastened to the rear part of the tone arm behind a supporting bearing dividing the tone arm into a front part with a stylus holder and a rear part with a counterweight, the main task of which is to counterbalance the weight of the front part of the tone arm with the stylus holder, and to achieve a virtual equilibrium. The required vertical tracking force on the stylus is applied so that the whole counterweight or its part is shifted by a turning motion along a thread from the position of equilibrium to the supporting bearing of the tone arm until the front part of the tone arm, due to its larger weight, generates the required vertical force on the stylus according to a scale and an indicator on the counterweight. This method is, in principle, rather simple; the practical solution is, however, complicated, because of the close spacing between the center of gravity of the tone arm and the counterweight. This makes it difficult to provide for an easy adjustment of the vertical tracking force, such arrangement at the same time being resistant to undesirable disturbances during the adjustment of this force. It is also rather difficult to provide a thus arranged counterweight with an effective anti-resonator, or to build it into the tone arm in a fairly simple manner.

In a smaller number of tone arms the counterweight at the rear of the tone arm is assigned the sole task of balancing the tone arm in order to obtain an equilibrium, whereby the vertical tracking force on the stylus is adjusted either by a small weight on the front part of the tone arm or by a spring for a vertical movement arranged near the supporting bearing. This small weight on the front part of the tone arm, however, increases the effective weight of the arm, while the use of a spring is generally more complicated and usually less accurate.

SUMMARY OF THE INVENTION

It is an object of this invention to provide an arrangement for the adjustment of the tracking force on the stylus of a phonograph stylus holder which is easy to operate and which is stable in operation. The arrangement according to this invention is slidably disposed on the shorter rear part of a flat tone arm, with a rack gear provided on this rear part of the tone arm and with at least one reinforcing element arranged on the lower side of the rear part of the tone arm, a rotatable adjusting element with a pinion engaging with said rack gear and a counterweight system situated below the tone arm and connected to said rotatable adjusting element, and with means for a longitudinal guiding of the counterweight system on the rear part of the tone arm.

Advantages of the solution according to this invention are its mechanical simplicity and ease of manufacturing, particularly for tone arms of flat cross-section, and furthermore the possibility of situating the counterweight below the tone arm separately from the tracking force adjusting element situated on its upper side, so that the center of gravity of the counterweight is rather low with respect to the supporting bearing of the tone arm. This permits the vertical pivotal movement of the tone arm so that a sufficiently stable equilibrium of the tone arm is achieved.

Another advantage of the invention is the possibility for an optimum location of an effective dynamic vibration absorber permitting an oscillating movement of practically the whole weight of the counterweight, particularly with tone arms of flat cross-section.

DESCRIPTION OF THE DRAWING

The arrangement for adjustment of the vertical tracking force on the stylus of a phonograph will be described in the following specification in connection with an exemplary embodiment thereof shown in the attached drawing, wherein.

DESCRIPTION OF PREFERRED EMBODIMENT

Figure 1:
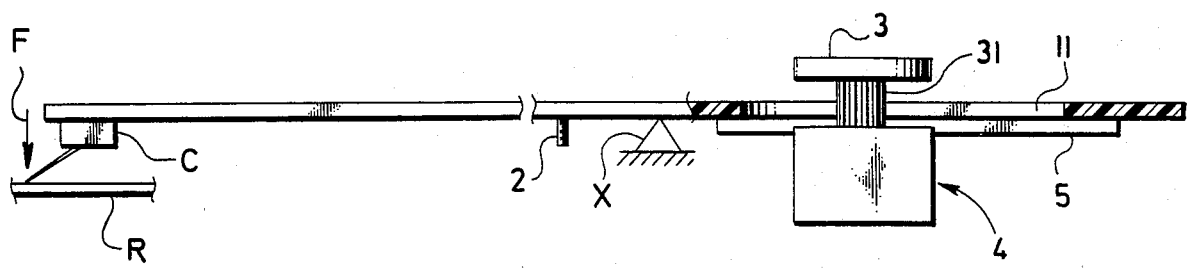
FIG. 1 is a view in elevation of the arrangement of the invention, parts thereof being shown in section.
Figure 2:
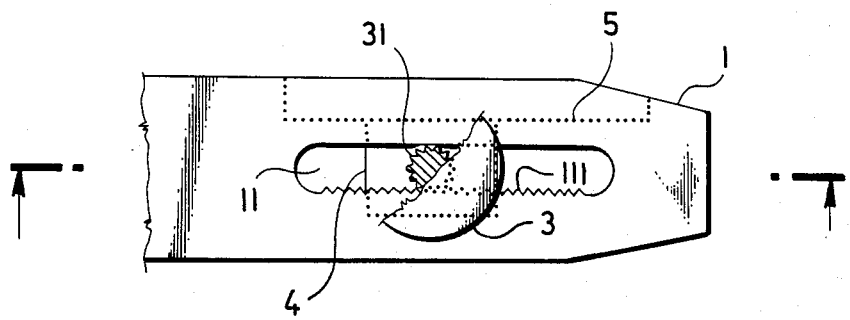
FIG. 2 is a fragmentary view in plan of the rear part of the tone arm.

Turning first to FIG. 1, the main part of the arrangement for the adjustment of the vertical tracking force on the stylus of a phonograph stylus holder is a flat tone arm which is provided at its front part with a mechanical element 2 for arresting the tone arm in its rest position on an arresting stand and in its rear part in the direction rearwardly away from the supporting bearing X of the tone arm with a longitudinal opening or slot 11. One side of slot 11 is formed as the rack gear 111 as shown in FIG. 2. The rack 111 can, of course, be provided on any other part of the rear portion of the tone arm 1, for instance, on lateral edges or in a slot of one of the lateral edges, or it can be connected to the tone arm as an independent part. Examples of such alternative constructions are shown and described in the co-assigned application of Janda Ser. No. 437,628 filed 10/29/82.

The stylus holder C with the stylus are fixed to the front part of the tone arm 1 such stylus in the course of operation of the phonograph being pressed against the phonograph record R from above by an adjustable vertical force F.

A pinion 31 of a rotatable adjusting element 3 provided with a scale indicating the vertical force F meshes with the rack 111. Pinion 31 is shifted in the course of rotation of the element 3 along the rear part of the tone arm 1 toward or away from the bearing X for supporting the tone arm. A counterweight 4 to which the adjusting element is rotatably connected, slides along and is supported by a guide 5 which prevents its rotation as the adjusting element 3 is turned. It will be seen that the turning of adjusting element 3 causes it and also the counterweight 4 to move toward or away from the supporting bearing X. The slot 11 in the rear end of the tone arm, the adjusting means 3, the pinion 31, and the counterweight 4 are advantageously disposed along the center longitudinal axis of the tone arm. The counterweight 4 is advantageously disposed below the axis of the supporting bearing X for the tone arm 1, as shown in FIG. 1, in order to achieve its optimum stable state of equilibrium. It is to be noted that the member 5, as well as constituting a guide for the counterweight 4 which prevents its turning as the adjusting member 3 is turned, also constitutes a reinforcement for the rear end portion of the tone arm.

Although the invention is described and illustrated with reference to a single preferred embodiment thereof, it is to be expressly understood that it is in no way limited to the disclosure of such preferred embodiment but is capable of numerous modifications within the scope of the appended claims.

We claim:

1. An arrangement for the adjustment of the vertical tracking force on a stylus mounted in a phonograph stylus holder disposed on the outer end of a forward longer end portion of a phonograph tone arm, said tone arm being mounted upon and supported by a bearing, the tone arm having a shorter part thereof extending rearwardly from the bearing, said shorter rear part of the tone arm being provided with a slot having a rack gear on one side of the slot and with a rotatable adjustment element with a pinion meshing with said rack gear, a counterweight system situated below the tone arm and connected to said rotatable adjustment element so as to be moved selectively in opposite directions lengthwise of the rear portion of the tone arm, and means for the longitudinal guiding of the counterweight system along the rear part of the tone arm.

2. An arrangement as claimed in claim 1, wherein the means for the longitudinal guiding of the counterweight system along the rear part of the tone arm also serves as a reinforcement element for the rear part of the tone arm.

3. An arrangement for the adjustment of the vertical tracking force on a stylus mounted in a phonograph stylus holder disposed on the outer end of a forward longer end portion of a phonograph tone arm, said tone arm being mounted upon and supported by a bearing, the tone arm having a shorter part thereof extending rearwardly from the bearing, said shorter rear part of the tone arm being provided with a rack gear and with a rotatable adjustment element with a pinion meshing with said rack gear, a counterweight system situated below the tone arm and connected to said rotatable adjustment element so as to be moved selectively in opposite directions lengthwise of the rear portion of the tone arm, and means for the longitudinal guiding of the counterweight system along the rear part of the tone arm, wherein said longitudinal guiding means also serves as a reinforcement element for the rear part of the tone arm.

* * * * *